United States Patent
Dold

(10) Patent No.: US 6,202,509 B1
(45) Date of Patent: Mar. 20, 2001

(54) CORRUGATED GEAR WITH IMPROVED PULSATOR

(75) Inventor: Michael Dold, Gainesville, GA (US)

(73) Assignee: IMS Morat Soehne GmbH (DE)

( * ) Notice: Subject to any disclaimer, the term of this patent is extended or adjusted under 35 U.S.C. 154(b) by 0 days.

(21) Appl. No.: 09/356,213

(22) Filed: Jul. 16, 1999

(30) Foreign Application Priority Data

Jul. 24, 1998 (DE) .............................. 198 33 290

(51) Int. Cl.[7] .................................................. F16H 49/00
(52) U.S. Cl. .......................... 74/640; 74/411; 74/DIG. 10
(58) Field of Search ....................... 74/411, 640, DIG. 10

(56) References Cited

U.S. PATENT DOCUMENTS

| 3,406,583 | * | 10/1968 | Baier | ....................... 74/411 |
| 4,619,156 | * | 10/1986 | Kiryu | ....................... 74/640 |
| 5,000,721 | * | 3/1991 | Williams | ................. 464/37 |

FOREIGN PATENT DOCUMENTS

| 197 35 051 A1 | 3/1998 | (DE) | ............................... F16H/25/06 |
| WO 98/0008 | 2/1998 | (WO) | ............................ F16H/49/00 |

* cited by examiner

*Primary Examiner*—Allan D. Herrmann
(74) *Attorney, Agent, or Firm*—Pendorf & Cutliff

(57) ABSTRACT

The invention concerns a drive shaft with a rigid support ring (1) with a cylindrical, internally geared support surface (3), with a radially flexible roller bushing (5) with an outwardly geared outer surface (7), with a drive device (30) connected with a drive shaft (11), through which over a plurality of spokes and planetary arms (40) one or several first circumference sections are held in engagement with the support surface (3) of the support ring (1), wherein each of the spokes or planetary arms (40), at least on one of its two ends, has a slit-like indentation and the spokes or planetary arms (40) are connected with each other through a one piece unitarily formed ring band, whereby the ring formed band is formed-on at least approximately at half length of the spokes or planetary arms (40).

6 Claims, 4 Drawing Sheets

CORRUGATED GEAR WITH IMPROVED PULSATOR

BACKGROUND OF THE INVENTION

1. Field of the Invention

The invention concerns a corrugated gear.

The conventional corrugated gears are generally known under the name "Harmonic Drive". In these harmonic drive gears there is within a rigid or fixed support ring, which has a cylindrical, inwardly geared support surface, an outwardly geared, radially flexible roller bushing, which for example via a suitable drive device is elliptically deformed. Inward to outward gearing differs by one or more teeth. The geared rim of the radially flexible roller bushing is pressed by a, for example, elliptically deformed drive core of a drive unit, against the cylindrical, internally geared support surface of the rigid support ring. On the basis of the differential tooth count between support surface and roller bushing there is a permanent, continuous displacement of the circumferences which engage with each other. One entire rotation of the drive shaft brings about hereby only a further movement of the roller bushing about the predetermined differential of the tooth count between support ring and roller bushing. The harmonic-drive unit can thus achieve a very high rate of reduction.

2. Description of the Related Art

One example of such a gear is described in DE 38 15 118 A1. For deformation of the roller bushing a drive shaft is provided, upon which in the circumference direction a drive element with elliptical or at least essentially elliptical cross section is fixedly seated. The roller bushing is provided rotatably or as the case may be slidably upon this drive element by means of roller bearings. In place of the roller bearings another type of mounting, for example a sliding bearing, can be provided. As a result of the elliptical design of the mentioned drive element the roller bushing is likewise elliptically deformed and oppositely lying positions are brought into engagement with the internal teething of the rigid support ring.

An alternative embodiment of the reduction gear described in this document has a planetary gear unit as the drive device within the roller bushing. This is comprised of a first sun gear provided on the drive shaft and driven thereby, and on the outer circumference thereof at two oppositely lying positions to planetary gears are in engagement. These planetary gears are rotatably mounted on a framework which is rotatably mounted on the drive shaft. The roller bushing is pressed against the inner surface of the support ring at two oppositely lying positions by the planetary gears, so that a gear engagement occurs at these positions.

The driven side is so designed in this previously known gear, that the roller bushing exhibits an elongated area in the direction of the drive shaft. This elongated area is fixedly connected with a transmission element which is mounted rotatable and concentric to the support ring via pegs or journals. The pegs are radially oriented in the elongated area of the roller bushing and engaged in recesses in the respective other of the two elements. The already mentioned transmission element is connected with the drive shaft fixed against rotation. By such a solution an influence of the transmission element upon the deformed roller bushing is avoided so that a comparatively more compact construction of the total gear unit can be achieved.

A problem with this previously known gear is the fact that the drive shaft rotates with the same speed as the roller bushing. The overall reduction with this gear is thus limited.

A further gear, which operates on the manner of a harmonic drive gear, is known from WO97/08008. The drive unit for deforming the roller bushing is comprised of a plurality of essentially radially extending spokes or push rods of the same length, as transmission elements, which are supported upon a so-called "eccentric" drive core, in particular elliptic shaped or triangular, wherein the inner circumference of the drive core has a substantially smaller diameter than in the roller bushing which is basically cylindrical and radially flexible. The individual spokes or transmission elements or as the case may be planet arms move radially outwardly during rotation of the elliptical or triangular drive core and then again inwards. The spokes or planetary arms quasi "pulsate", which brings about a corresponding pulsation of the roller bushing. For this reason in the following the term "pulsator" will be employed in general for spokes or planetary arms, that is, for transmission elements.

This "pulsator" is subjected to strong torque production in the case of large gears, that is, the individual spokes or planetary arms can buckle. Further, is has been shown in practice, that the known "pulsator" causes noise.

SUMMARY OF THE INVENTION

This point marks the beginning of the present invention.

The goal of the invention is to further develop the above described known drive shafts such that for their part the noise production is reduced and in addition the efficiency or output of the gear is improved.

Further developments are set forth in the dependent claims.

BRIEF DESCRIPTION OF THE DRAWINGS

The shaft or, as the case may be, reduction gear according to the invention is described in greater detail in the following on the basis of an illustrative embodiment shown in the figures. There is shown.

DETAILED DESCRIPTION OF THE INVENTION

In the following figures, unless indicated otherwise, the same reference numbers refer to the same parts having the same meaning.

Figure 1:
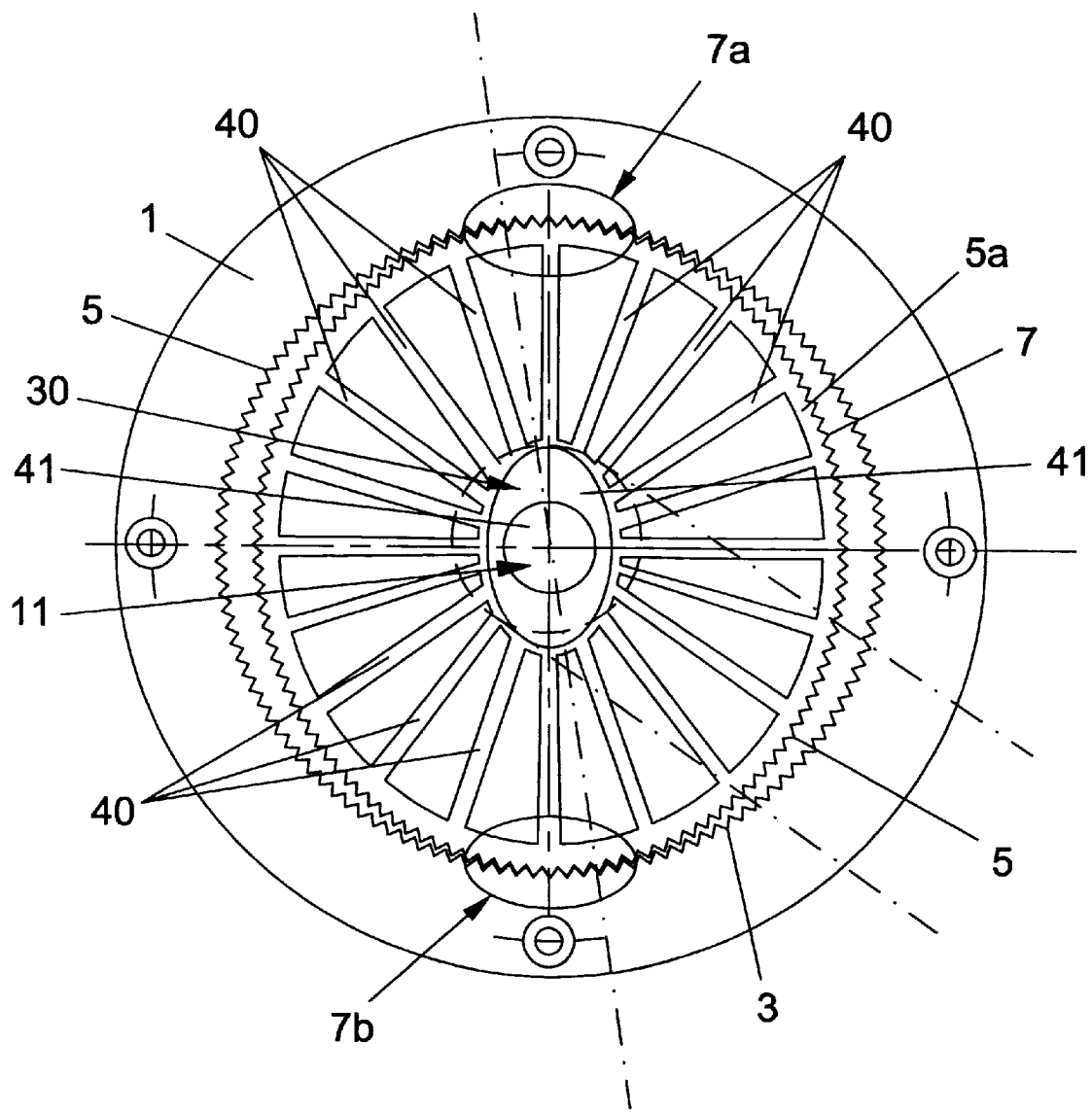
FIG. 1: An embodiment of a known reduction gear, in which a number of spokes are supported on an elliptical drive core as "pulsator"

In FIG. 1 an embodiment of a known reduction gear as disclosed in WO97/08008 is shown in sectional view. Reference is made to this publication for purposes of disclosure and explanation of the manner of operation of this type of gear.

The tooth ring of the roller bushing 5 is, as shown in FIG. 1, meshing or in engagement at two diametrically opposing circumference sections with the internal gearing of the support ring 1. This is achieved by an elliptical drive core 41 of a drive device 30. In order to bring the gear ring 5a into mating or mesh engagement at three circumference sections with the support surface, the drive core 41 can have an at least approximately triangular shaped cross section (not shown).

As shown, the spokes 40 are formed unitarily on the gear ring of the roller bushing 5. However, this need not necessarily be the case. As described in WO97/08008, the gear ring can also be formed separate from the spokes (compare FIGS. 21 to 24 and associated text). However, in that case the loose spokes must be maintained in a guide cage.

Figure 2:
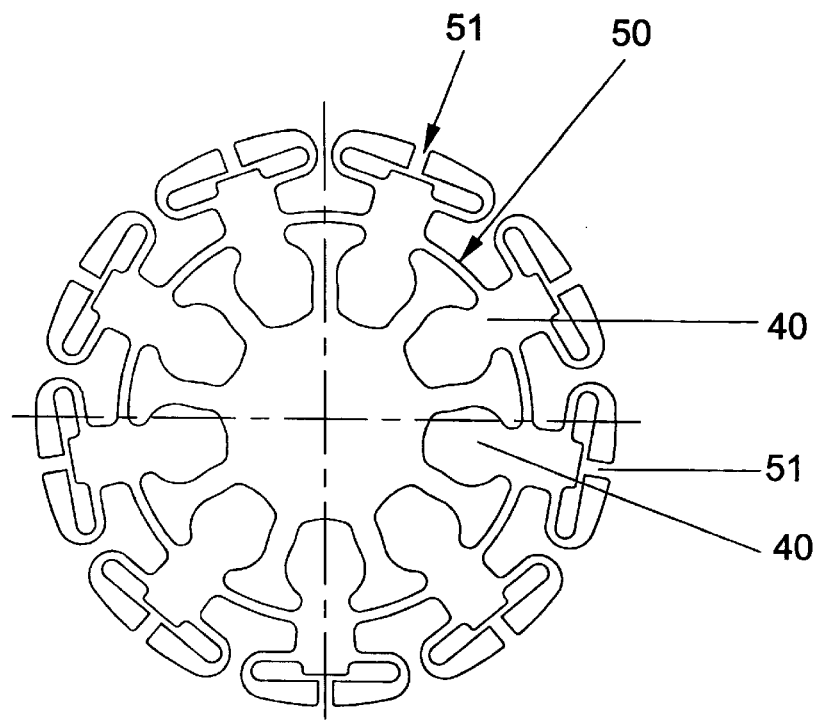
FIG. 2: a first inventive embodiment of an improved "pulsator" in a side view.
Figure 3:
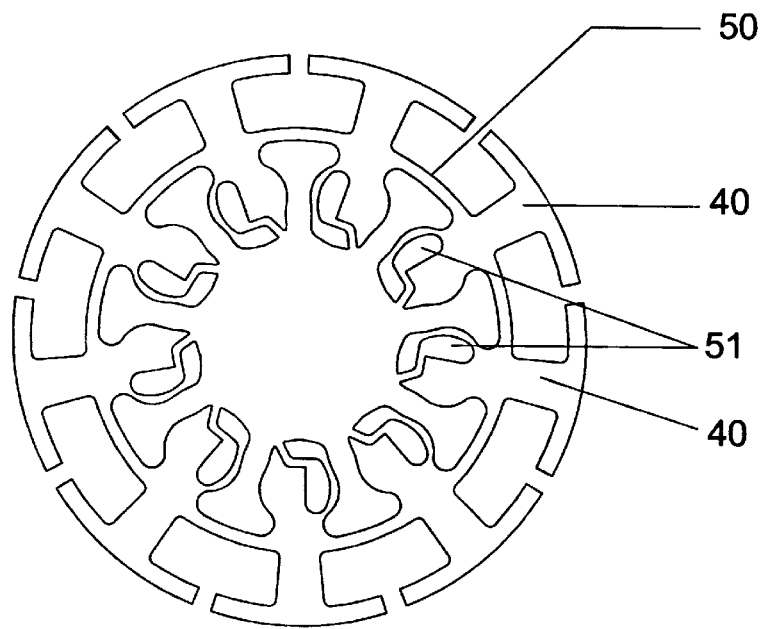
FIG. 3: a second inventive embodiment of an improved "pulsator" likewise in side view.

In the place of these spokes which are loose with respect to each other within the guide cage, there are provided in accordance with the invention specially designed pulsators for the deformation of the gear ring, such as those shown in FIGS. 2 and 3.

In the embodiment according to FIG. 2 a pulsator is shown made of a flexible material, preferably plastic. This pulsator is comprised of a number of spokes or as the case may be planetary arms 40, here for example nine. The spokes 40 are connected with each other through a one piece unitarily formed ring band 50. This ring band is relatively thin in comparison to the thickness of the spokes 40.

The shape of each spoke 40 is selected in such a manner, that the cross section of the spoke 40 somewhat broadens from the ring band 50 in the direction of the center, and then begin becoming thinner. In the opposite direction, that is towards outwards, the cross section remains the same, wherein at the end a flattened circular shaped element connects unitarily. This element exhibits a central slit 51.

The structure of a spoke is similar to the contour of a pacifier with retainer ring, wherein the retainer is centrally interrupted.

For the remaining details of the inventive design of the spokes reference is made to the detailed representation in FIG. 2.

In FIG. 3 a second embodiment is shown. The spokes are designed to be approximately T-shaped, wherein the transverse cross member is slightly bowed, so that the cumulative cross pieces of the spokes 40 define a circular ring. The slit-like inward groove, which as shown in FIG. 2 contribute to the spring support or dampening of the spokes 40, are now formed onto the inner ends of the spokes 40 and run, viewed in side view, approximately L-shaped into the spoke 40.

Via the ring band 50 the spokes or as the case may be transmission elements are maintained spaced apart. The radial mobility remains maintained, wherein the deformation loss is smaller than in the case of smaller units which slide against each other.

The ring band 51 is sufficiently stiff in the tangential direction so that the spokes 40 cannot tilt away by the sideward rubbing force of the drive core.

As a result of the geometric design or shape of the spoke 40 inclusive of inward groove 51 a radially effective spring element is produced, which has the following tasks:

The internal friction or rubbing areas of the elements are always pressed against the drive core, whereby a lifting-off from the surface thereof, and noises caused thereby, are avoided.

For the parts a greater degree of tolerance is permitted, since as a result of the spring force a frictional engagement between the transmission element and the roller bushing is always ensured.

These characteristics are particularly important in parts made of plastic, in order to compensate for the comparatively large thermal expansion in the temperature range in the environment of use.

Figure 4:
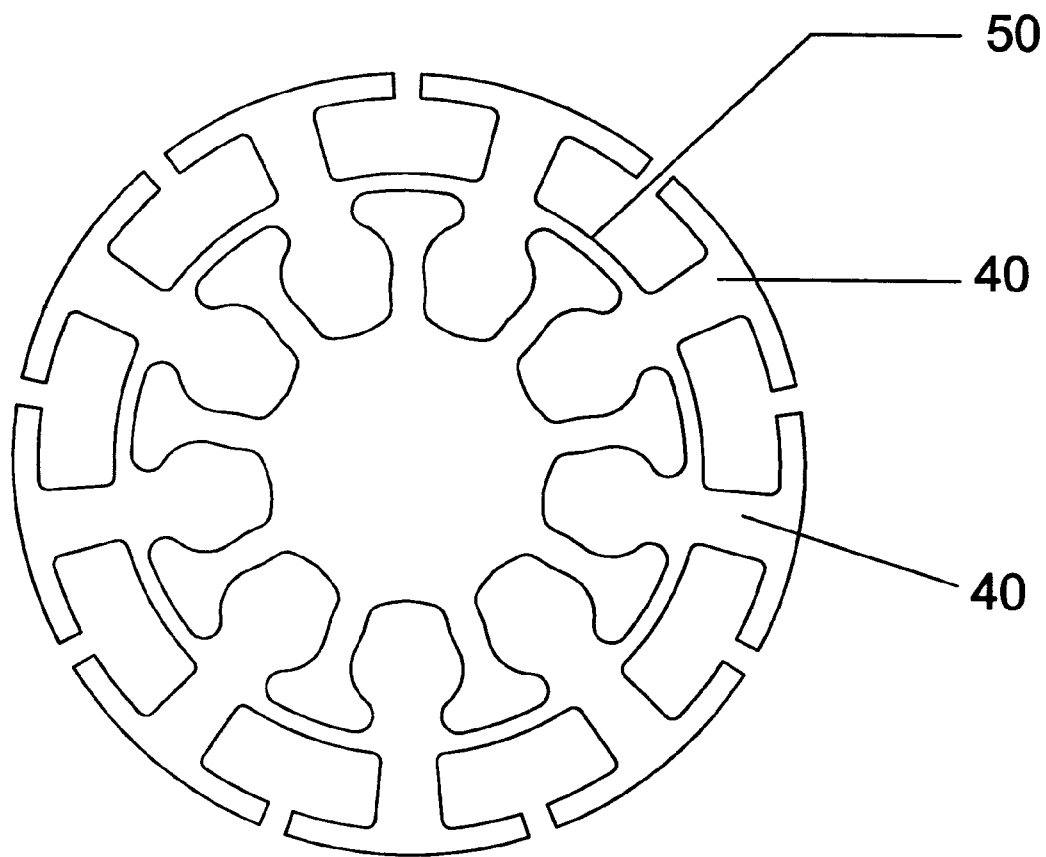
FIG. 4: a third inventive embodiment of an improved "pulsator" likewise in side view.
Figure 5:
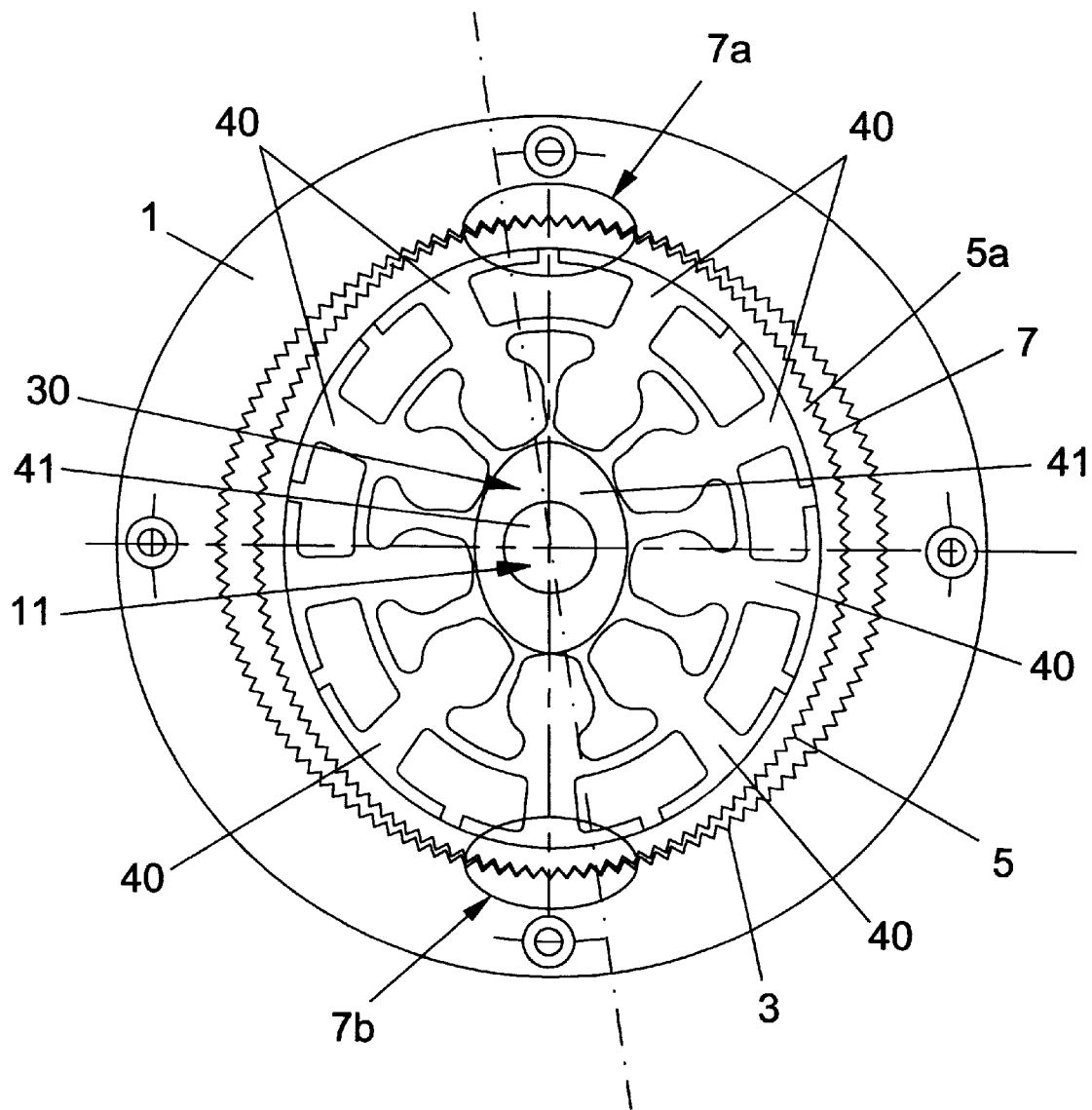
FIG. 5: this figure is a combination of FIGS. 1 and 4.

The spring effect can also be achieved thereby, that the spokes 40 are made at least partially of an elastic composition, which is possible for example by a 2-component injection molding process. An example thereof is shown in FIG. 4. The design of the pulsator corresponds to FIG. 2. However herein no small slits are provided in the spokes 40.

The entire transmission element can be produced in a single part by an injection molding process, which saves on assembly and finishing costs.

REFERENCE NUMBER LIST 1 support ring
3 support surface
5 roller bushing
7 outer jacket surface
7a, 7b circumference section
40 spoke, planetary arms
41 drive core
50 ribbon or ring band
51 indentation

What is claimed is:

1. A corrugated gear, comprising:
   a rigid support ring (1) with a cylindrical, internally geared support surface (3);
   a radially flexible roller bushing (5) with an outwardly geared outer surface (7) and inner surface, and positioned within said support ring (1);
   an elliptically deformed drive core (30) driven by a drive shaft (11),
   a plurality of spokes or planetary arms (40), each of which is at least partially elastic, extending radially between said drive core (30) and said roller bushing (5),
   a one-piece unitarily formed ring band connecting said spokes or planetary arms (40) with each other at approximately half their length,
   wherein one or more first circumference sections (7a, 7b) of the outer surface (7) of the roller bushing (5) are held in engagement with said support surface (3) of the support ring (1).

2. A corrugated gear according to claim 1, wherein the elasticity of the spokes (40) is achieved by forming the spokes (40) at least in part of an elastic material.

3. A corrugated gear according to claim 1, wherein the elasticity of the spokes (40) is achieved by forming a slit-like indentation (51) on at least one of the two ends of the spokes (40).

4. A corrugated gear according to claim 3, wherein the indentation (51) is L-shaped.

5. A corrugated gear according to claim 3, wherein said indentation (51) is provided on the inner end of the spoke (40).

6. A corrugated gear according to claims 3, wherein said indentation (51) is provided on the outer end of the spoke (40).

* * * * *